United States Patent
Vu et al.

(10) Patent No.: US 7,100,630 B2
(45) Date of Patent: Sep. 5, 2006

(54) WATER GUARD PRESSURE BALANCER

(75) Inventors: Vinh T. Vu, Lawndale, CA (US); Edward Erdely, Aliso Viejo, CA (US)

(73) Assignee: Newfrey LLC, Newark, DE (US)

( * ) Notice: Subject to any disclaimer, the term of this patent is extended or adjusted under 35 U.S.C. 154(b) by 222 days.

(21) Appl. No.: 10/735,205

(22) Filed: Dec. 12, 2003

(65) Prior Publication Data
US 2005/0126648 A1 Jun. 16, 2005

(51) Int. Cl.
*F16K 11/07* (2006.01)
*F16K 11/16* (2006.01)

(52) U.S. Cl. .................................. 137/98; 137/625.41
(58) Field of Classification Search .................. 137/98, 137/100, 625.17, 625.41, 625.47, 597
See application file for complete search history.

(56) References Cited

U.S. PATENT DOCUMENTS

| | | | |
|---|---|---|---|
| 4,901,750 A * | 2/1990 | Nicklas et al. | 137/270 |
| 4,979,530 A * | 12/1990 | Breda | 137/100 |
| 5,275,195 A * | 1/1994 | Breda | 137/100 |
| 5,501,244 A | 3/1996 | Shahriar | |
| 5,505,225 A | 4/1996 | Niakan | |
| 5,730,171 A | 3/1998 | Niakan | |
| 5,873,385 A | 2/1999 | Bloom et al. | |
| 5,884,652 A | 3/1999 | Yeh et al. | |
| 5,931,181 A | 8/1999 | Cook et al. | |
| 6,012,476 A | 1/2000 | Ko | 137/98 |
| 6,123,094 A * | 9/2000 | Breda | 137/98 |
| 6,237,622 B1 | 5/2001 | Cook et al. | |
| 6,325,089 B1 * | 12/2001 | Breda | 137/98 |
| 6,427,713 B1 * | 8/2002 | Dempsey et al. | 137/98 |
| 6,517,006 B1 | 2/2003 | Knapp | |

\* cited by examiner

Primary Examiner—Stephen M. Hepperle
(74) Attorney, Agent, or Firm—Harness, Dickey & Pierce, P.L.C.

(57) ABSTRACT

A fluid supply valve includes a valve plate having cold and hot apertures respectively aligned with the cold and hot inlets. A pressure balancer is rotatably supported adjacent to the mixing valve plate. The pressure balancer is rotatable between a closed position to prohibit fluid flow through the mixing valve plate and a range of positions to enable fluid flow through the pressure balancer and through the mixing valve plate to supply fluid from the outlet port.

9 Claims, 5 Drawing Sheets

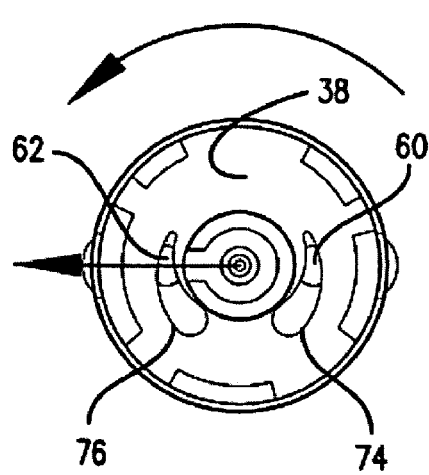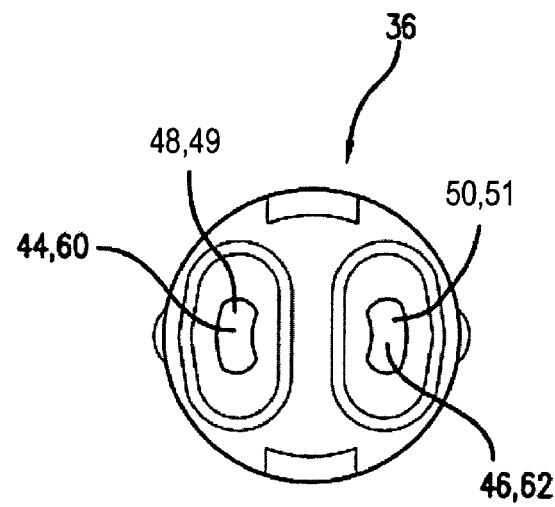
FIG 6A　　　　　　　FIG 6B
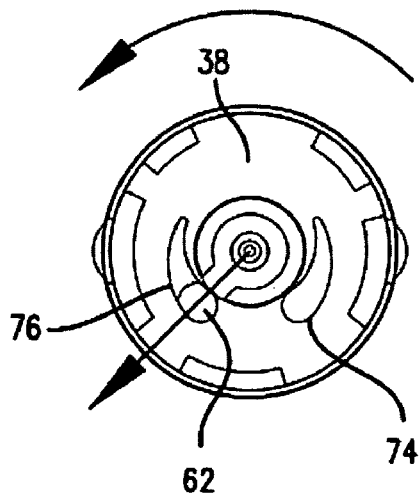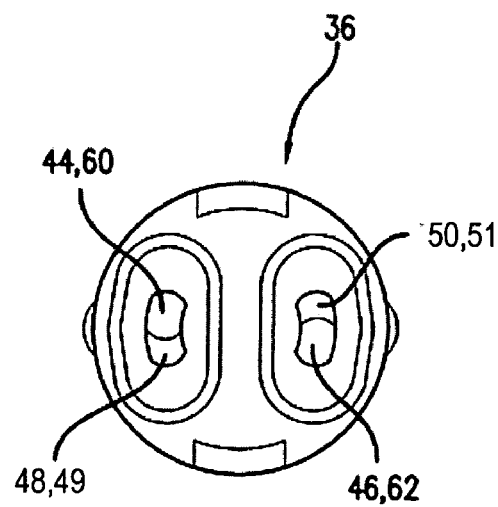
FIG 7A　　　　　　　FIG 7B

WATER GUARD PRESSURE BALANCER

FIELD OF THE INVENTION

The present invention relates to fluid supply devices, and more particularly to a guarded pressure balancer of a fluid supply device.

BACKGROUND OF THE INVENTION

Fluid supply devices are implemented in bath tubs and/or showers to control water flow. The fluid supply devices operate as a valve between cold and hot water supply lines. The fluid supply devices are articuable to provide cold water flow, hot water flow or varying degrees of mixed hot and cold water flow.

Contemporary fluid supply devices include a pressure balancer for balancing the pressure of the cold and hot water supply. For example, if cold water supply pressure suddenly drops, the pressure balancer adjusts the pressure of the hot water supply to compensate. In this manner, the temperature of the water supplied to the tub and/or shower remains constant. This prevents sudden supply of extremely cold or hot water from the tub/shower faucet.

The pressure balancer itself, however, can be sensitive to pressure spikes in the water supply line. While the fluid supply device is closed or "off" (i.e., water flow is prohibited into the tub and/or shower) pressurized cold and hot supply water is present within the pressure balancer. A sudden spike in pressure can result in damage to the pressure balancer, thereby preventing proper function of the pressure balancer.

SUMMARY OF THE INVENTION

Accordingly, the present invention provides a fluid supply valve in which a pressure balancer is located down stream of a valving to prohibit fluid flow into the pressure balancer when the fluid supply valve is in a closed position. As such, the pressure balancer is isolated from sudden line pressure spikes which might otherwise damage the fluid supply valve.

The fluid supply valve includes a mixing valve plate having cold and hot apertures respectively aligned with the cold and hot inlets. A pressure balancer with a sliding disc or valve plate fixedly attached to its bottom is rotatably supported adjacent to a housing though a fixed sealing disc or valve plate. The pressure balancer and its sliding valve plate are rotatable between a closed position to prohibit fluid flow through the pressure balancer sliding valve plate and a range of positions to enable fluid flow through the pressure balancer sliding valve plate and hence the pressure balancer to supply fluid from the outlet port.

In one feature, a cold flow position of the pressure balancer and its sliding valve plate enable fluid flow through the cold aperture of the housing and through a cold fluid passage of the pressure balancer to supply cold fluid from the outlet port.

In another feature, a mixed flow position of the pressure balancer and its sliding valve plate enable fluid flow through the cold and hot apertures of the housing and through cold and hot passages of the pressure balancer to supply mixed temperature fluid from the outlet port.

In still another feature, a hot flow position of the pressure balancer and its sliding valve plate enable fluid flow through the hot aperture of the housing and through a hot passage of the pressure balancer to supply hot fluid from the outlet port.

In yet another feature, the supply valve further includes a mixing plate having cold and hot mixing apertures. The cold and hot mixing apertures can be respectively aligned with cold and hot fluid passages of the pressure balancer based on rotation of the pressure balancer to enable fluid flow to the outlet port.

In still another feature, the pressure balancer includes cold and hot fluid stream passages separated by a diaphragm that maintains a pressure balance therebetween.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6A is a front view of the pressure balancer cartridge in a mixed water position;

FIG. 6B is a back view of the pressure balancer cartridge in the mixed water position;

FIG. 7A is a front view of the pressure balancer cartridge in a hot water position; and FIG. 7B is a back view of the pressure balancer cartridge in the hot water position.

DETAILED DESCRIPTION OF THE PREFERRED EMBODIMENTS

The following description of the preferred embodiments is merely exemplary in nature and is in no way intended to limit the invention, its application, or uses.

Figure 1:
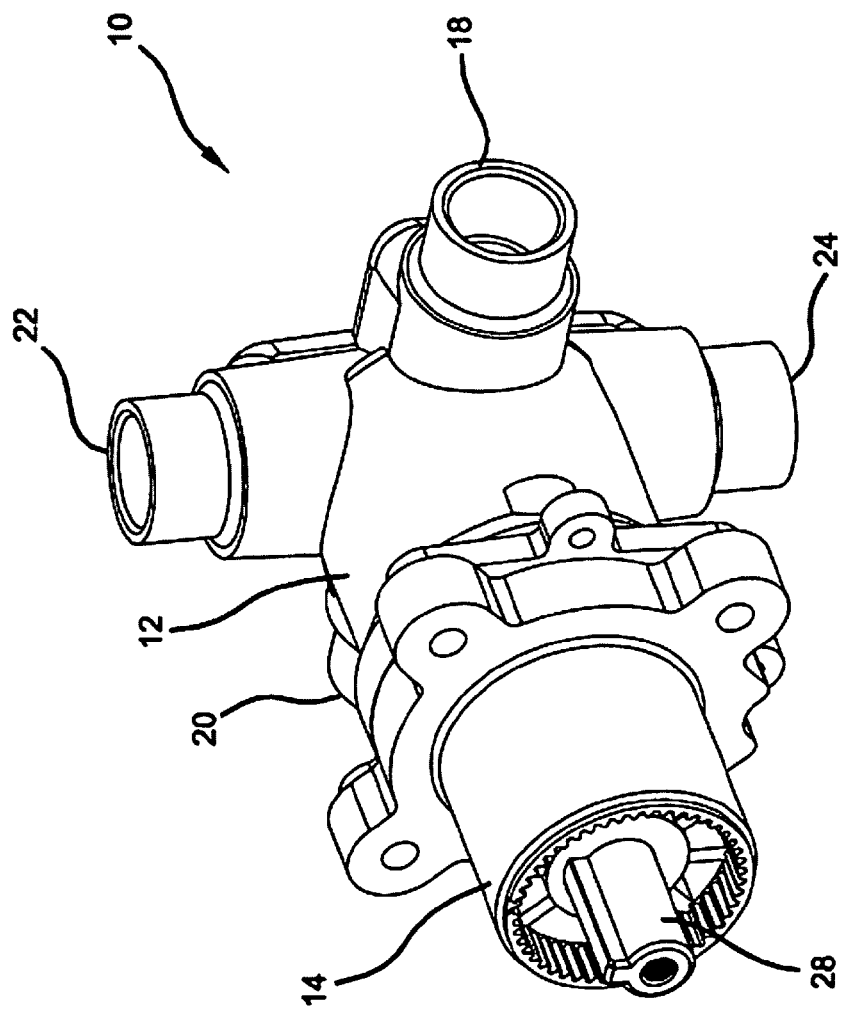
FIG. 1 is a perspective view of a supply valve according to the present invention.
Figure 2:
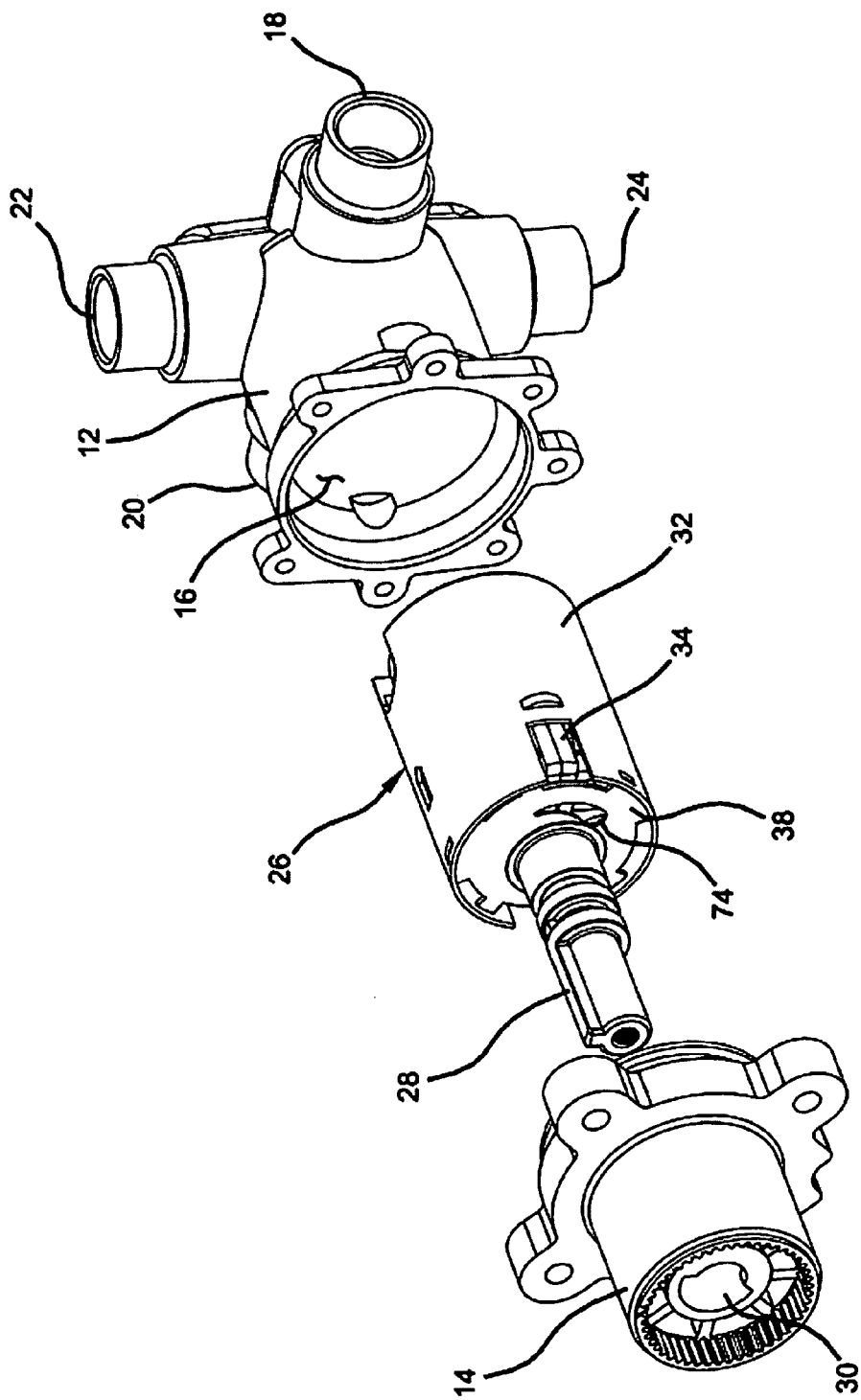
FIG. 2 is an exploded view of the supply valve of FIG. 1 detailing a pressure balancer cartridge.
Figure 3:
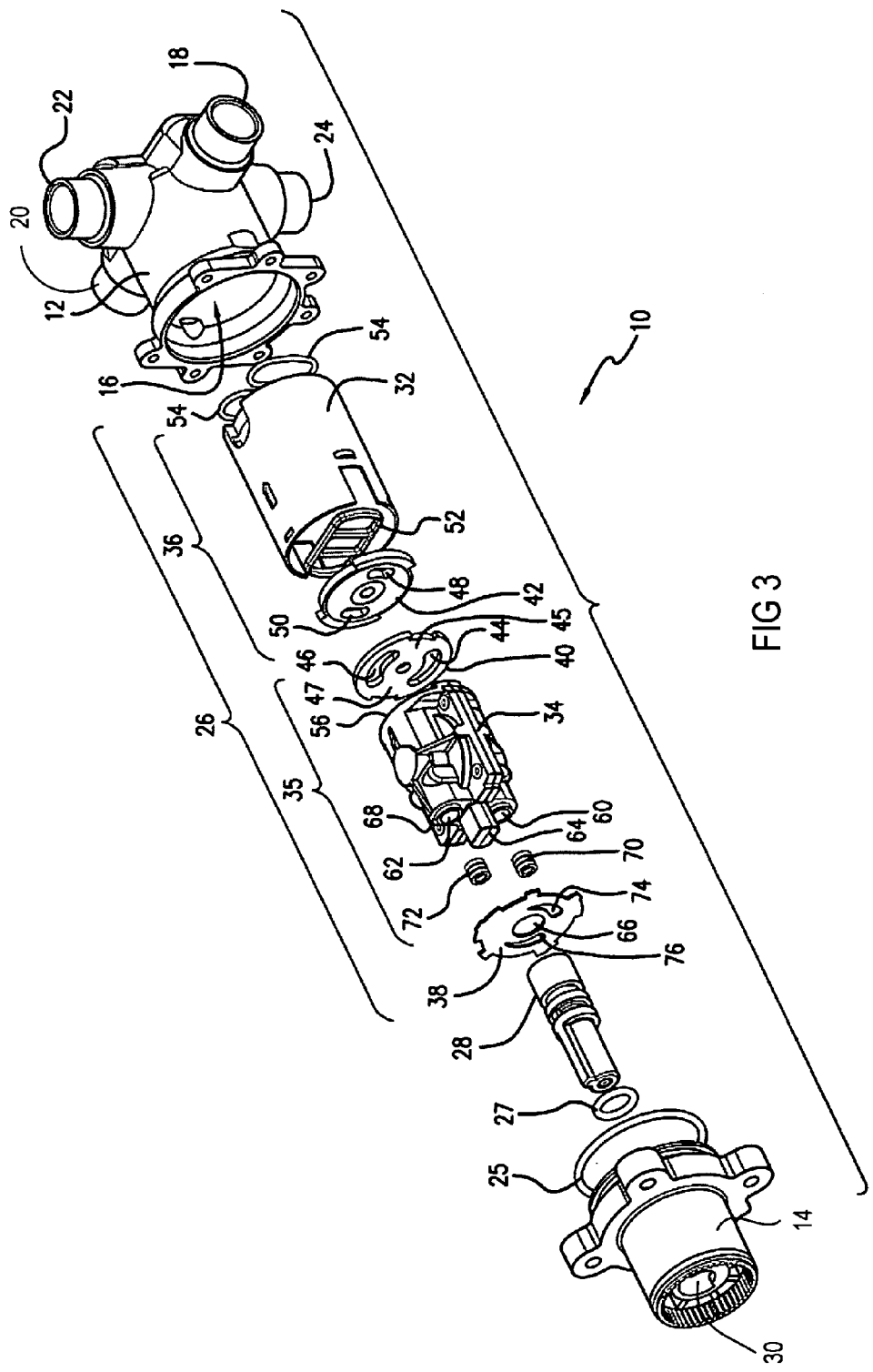
FIG. 3 is an exploded view of the pressure balancer cartridge of FIG. 2.

Referring now to FIGS. 1 through 3, a fluid supply device 10 is shown. The fluid supply device 10 includes a casing 12 and a bonnet 14. The casing 12 includes a cavity 16, a cold inlet port 18, a hot inlet port 20, an upper outlet port 22 and a lower outlet port 24. A supply valve 26 is disposed within the cavity 16. The bonnet 14 is fixed to the casing 12 by fasteners (not shown) to enclose the supply valve 26 within the casing 12. An o-ring 25 provides sealed contact between the bonnet 14 and the casing 12. A stem 28 extends through an aperture 30 of the bonnet 14. The stem 28 is rotatable to control fluid flow through the supply valve 26. An o-ring 27 provides sealed contact between the bonnet 14 and the stem 28.

The supply valve 26 includes a cylindrical housing 32 having an end open and cold and hot fluid passages 49,51 (shown in FIG. 4B) formed in an opposite end respectively connecting with the cold inlet port 18, and hot inlet port 20.

A mixing plate 38 is snapped to the housing 32. A sealing disc 42 is fixedly attached to the inner bottom of the housing 32 to create a housing assembly 36. The housing assembly 36 is fixedly received within cavity 16 and altogether are fixed from rotation and restrained thereby. A sliding disc 40 is fixedly attached to bottom of a pressure balancer 34 to create a pressure balancer assembly 35 and are together rotatable between the sealing disc 42 and the mixing plate 38 within cavity 16. The pressure balancer 34 is preferably a diaphragm-type assembly such as that disclosed in U.S. Pat. No. 5,501,244, U.S. Pat. No. 5,730,171 or U.S. Pat. No. 6,237,622, the disclosure of which is expressly incorporated by reference herein. The housing assembly 36 including the mixing plate 38 and the sealing disc 42 is fixed from rotation, whereby the pressure balancer assembly 35 rotates relative to each. The pressure balancer assembly 35 is rotatable within the housing assembly 36 to selectively enable fluid flow through the pressure balancer assembly 35 itself and the mixing plate 38 as described in further detail below. The sealing disc 42 respectively includes cold and hot apertures 48,50 which always respectively align with the cold and hot apertures 49,51 of the housing 32. The sliding disc 40 includes cold and hot apertures 44,46 respectively and two blocking surfaces on back faces of surfaces 45,47. These blocking surfaces function to seal fluid communication from the cold and hot inlet ports 18,20 of the casing 12 when the pressure balancer assembly 35 and the housing assembly misalign (when the fluid supply device 10 is in the closed or off position.) More particularly, a gasket 52 provides sealed contact between the sealing disc 42 and the inner bottom of the housing 32. O-rings 54 between the outer bottom of the housing 32 and the bottom end of cavity 16 provide sealed contact about the cold and hot inlet ports 18,20 within the cavity 16 of the casing 12. The sliding disc 40 is in sealed contact with a back face 56 of the pressure balancer 34 by o-rings (not shown).

The pressure balancer 34 includes cold and hot fluid passages 60,62 which are separated by a diaphragm (not shown) within the pressure balancer 34 to enable pressure balancing therebetween. The pressure balancer 34 includes an extension 64 extending through a central aperture 66 of the mixing plate 38. The mixing plate 38 is in sealed contact with a front face 68 of the pressure balancer 34 by respective gaskets 70,72 of the cold and hot fluid passages 60,62. The mixing plate 38 includes cold and hot apertures 74,76 that respectively align with the cold and hot fluid passages 60,62 of the pressure balancer 34 when the pressure balancer assembly 35 is sufficiently rotated from a closed position. The cold and hot apertures 74,76 are tapered in a tear-drop shape to vary the rate of flow of fluid through the cold and hot fluid passages 60,62. The rate of flow is based on the relative rotational position of the pressure balancer assembly 35 within housing assembly 36.

The stem 28 is received over the extension 64 of the pressure balancer assembly 35 for coordinated rotation. The stem 28 provides a mount for a handle (not shown). The handle can be articulated to induce rotation of the stem 28 and pressure balancer assembly 35.

Figure 4A:
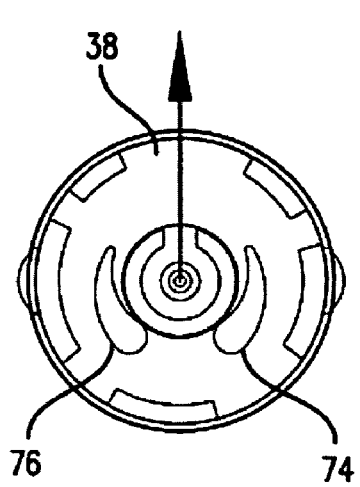
FIG. 4A is a front view of the pressure balancer cartridge in a closed position.
Figure 4B:
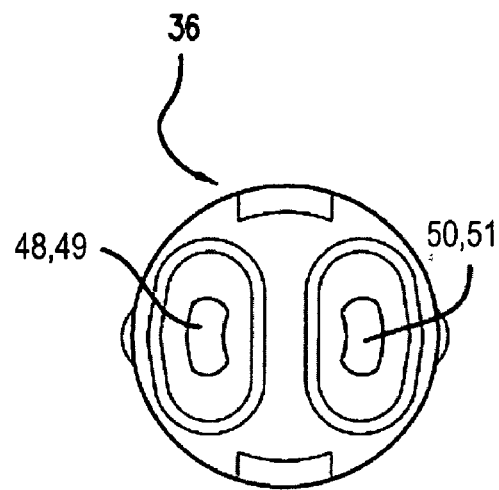
FIG. 4B is a back view of the pressure balancer cartridge in the closed position.

Referring now to FIGS. 4A through 7B, various positions of the pressure balancer assembly 35 relative to the housing assembly 36 and mixing plate 38 will be described. The closed position is illustrated in FIGS. 4A and 4B for the mixing plate 38 and the bottom of the housing assembly 36, respectively. When the pressure balancer assembly 35 is in the closed position, the cold and hot apertures 74,76 of the mixing plate 38 are out of alignment with the cold and hot fluid passages 60,62 of the pressure balancer assembly 35. Similarly, the cold fluid passages 44,60 and hot fluid passages 46,62 of the pressure balancer assembly 35 are out of alignment with the cold fluid passages 48,49 and hot fluid passages 50,51 of the housing assembly 36 prohibiting fluid flow through the pressure balancer assembly 35. In concurrence, the back faces of surfaces 45,47 of the sliding disc 40 are in alignment with the cold fluid passages 48,49 and hot fluid passages 50,51 of the housing assembly 36 to subsequently seal off any fluid entering the pressure balancer 34. Therefore, in the closed position fluid flow is prohibited from the cold and hot inlet ports 18,20 through to the cold and hot fluid passages 60,62.

Figure 5A:
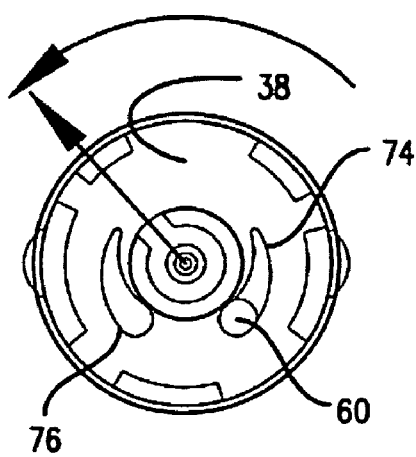
FIG. 5A is a front view of the pressure balancer cartridge in a cold water position.
Figure 5B:
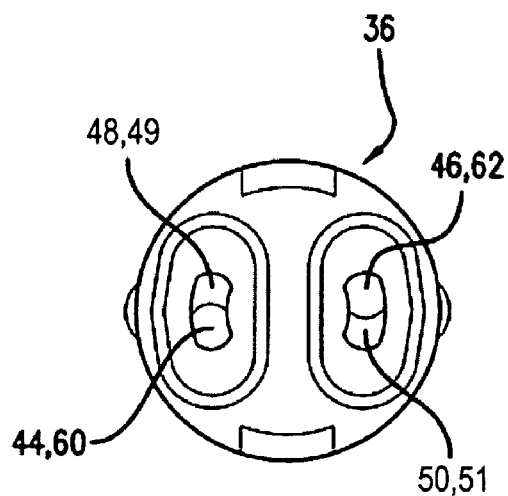
FIG. 5B is a back view of the pressure balancer cartridge in the cold water position.

When the pressure balancer assembly 35 is rotated from the closed position, varying degrees of fluid flow are enabled through the housing assembly 36, through the pressure balancer assembly 35 and through the mixing plate 38 to the upper and lower outlet ports 22,24. FIGS. 5A and 5B illustrate a cold water position of the pressure balancer assembly 35 relative to the mixing plate 38 and the bottom of the housing assembly 36. In the cold water position, the cold fluid passage 60 of the pressure balancer assembly 35 is aligned with the wider end of the tapered cold aperture 74 of the mixing plate 38 (see FIG. 5A). Concurrently, the cold fluid passages 44,60 and hot fluid passages 46,62 of the pressure balancer assembly 35 are partially aligned with the cold fluid passages 48,49 and hot fluid passages 50,51 of the housing assembly 36 (see FIG. 5B). Thus, cold fluid flow is enabled from the cold inlet port 18, through the housing assembly 36, through the pressure balancer assembly 35, through the mixing plate 38 between housing assembly 36 and casing 12 and out the upper and lower outlet ports 22,24. Hot fluid flow, however, is only enabled through the housing assembly 36 and into the hot fluid passage 62 of the pressure balancer assembly 35. Hot fluid flow completely through the pressure balancer assembly 35 is prohibited by the mixing plate 38 because the hot aperture 76 of the mixing plate 38 is not aligned with the hot fluid passage 62.

FIGS. 6A and 6B illustrate a mixed water position of the pressure balancer assembly 35 relative to the mixing plate 38 and the housing assembly 36. In the mixed water position, the cold and hot fluid passages 60,62 of the pressure balancer assembly 35 are aligned with the cold and hot apertures 74,76 of the mixing plate 38 (see FIG. 6A). Concurrently, the cold fluid passages 44,60 and hot fluid passages 46,62 of the pressure balancer assembly 35 are respectively fully aligned with the cold apertures 48,49 and the hot apertures 50,51 of the housing assembly 36 (see FIG. 6B). Thus, cold and hot fluid flow is enabled from the cold and hot inlet ports 18,20, through the housing assembly 36, through the pressure balancer assembly 35, through the mixing plate 38 between housing assembly 36 and casing 12 and out the upper and lower outlet ports 22,24 as a single, mixed fluid flow. It is appreciated that the pressure balancer assembly 35 is rotatable within a range of mixed water positions to control the cold and hot fluid flows, thereby varying the temperature of the fluid flow to the upper and lower outlet ports 22,24.

FIGS. 7A and 7B illustrate a hot water position of the pressure balancer assembly 35 relative to the mixing plate 38 and the housing assembly 36. In the hot water position, the hot fluid passage 62 of the pressure balancer assembly 35 is aligned with the wider end of the tapered hot aperture 76 of the mixing plate 38 (see FIG. 7A). Concurrently, the cold fluid passages 44,60 and hot fluid passages 46,62 of the pressure balancer assembly 35 are respectively partially aligned with the cold apertures 48, 49 and the hot apertures 50, 51 of the housing assembly 36 (see FIG. 7B). Thus, hot fluid flow is enabled from the hot inlet port 20, through the housing assembly 36, through the pressure balancer assembly 35, through the mixing plate 38 between housing assembly 36 and casing 12 and out the upper and lower outlet ports 22,24. Cold fluid flow, however, is only enabled through the housing assembly 36 and into the cold fluid passage 60 of the pressure balancer assembly 35. Cold fluid flow completely through the pressure balancer assembly 35 is prohibited by the mixing plate 38 because the cold aperture 74 of the mixing plate assembly 38 is not aligned with the cold fluid passage 60.

The supply valve 26 of the present invention prohibits fluid flow, whether hot or cold, into the pressure balancer 34 when in the closed position. As a result, the pressure balancer 34 is protected from any sudden line pressure spikes that could occur in the water supply line. Such line pressure spikes are cut-off from the pressure balancer 34 by the sliding disc 40 and the sealing disc 42.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid supply valve to supply a fluid stream, comprising:
   a first valve element having a first port formed therethrough;
   a second valve element rotatably fixed to said first valve element and having a second port formed therethrough;
   a pressure balancer interposed between, and rotatable relative to, said first valve element and said second valve element, said pressure balancer having an inlet passage and an outlet passage; and
   a sealing disc interposed between said first valve element and said pressure balancer, said sealing disc rotatably fixed to said first valve element and having an aperture alignable with said inlet passage of said pressure balancer based on rotation of said pressure balancer to enable fluid flow therethrough;
   wherein said pressure balancer is rotatably positionable to a closed position such that fluid communication from said first port to said inlet passage is prohibited; and
   wherein said pressure balancer is rotatably positionable in a range of flow positions such that fluid communication is established in a flow path from said first port through said inlet passage and said outlet passage to said outlet port.

2. The fluid supply of claim 1, wherein said second port is tapered to vary a fluid flow rate based on a rotational position of said pressure balancer relative to said second valve element.

3. A fluid supply valve to supply a fluid stream at a range of temperatures, comprising:
   a first valve element having a first inlet port and a second inlet port formed therethrough;
   a second valve element rotatably fixed to said first valve element and having a first outlet port and a second outlet port formed therethrough;
   a pressure balancer interposed between, and rotatable relative to, said first valve element and said second valve element, said pressure balancer having a first inlet passage, a first outlet passage, a second inlet passage and a second outlet passage; and
   a sealing disc interDosed between said first valve element and said pressure balancer, said sealing disc rotatably fixed to said first valve element and having first and second aDertures alignable resnectively with first and second inlet passages of said pressure balancer based on rotation of said pressure balancer to enable fluid flow therethrough;
   wherein said pressure balancer is rotatably positionable to a closed position such that fluid communication from said first inlet port to said first inlet passage and said second inlet port to said second inlet passage is prohibited; and
   wherein said pressure balancer is rotatably positionable in a range of flow positions such that fluid communication is established in at least one of a first flow path from said first inlet port through said first inlet passage and said first outlet passage to said first outlet port and a second flow path from said second inlet port through said first inlet passage and said first outlet passage to said first outlet port.

4. The fluid supply valve of claim 3, wherein each of said first and second outlet ports formed in said second valve element comprise a tapered port to vary a fluid flow rate based on a rotational position of said pressure balancer relative to said second valve element.

5. The fluid supply valve of claim 3, wherein one of said range of positions includes a first flow position of said pressure balancer to establish said first flow path.

6. The fluid supply valve of claim 3, wherein one of said range of positions includes a second flow position of said pressure balancer to establish said second flow path.

7. The fluid supply valve of claim 3, wherein one of said range of positions includes a third flow position of said pressure balancer to establish said first flow path and said second flow path.

8. The fluid supply valve of claim 3, wherein said pressure balancer is a diaphragm-type balancer.

9. A fluid supply device that supplies a fluid stream at a range of temperatures comprising:
   a casing having a first inlet, a second inlet and an outlet;
   a fluid supply valve disposed within said casing including:
      a valve housing having a first inlet port in fluid communication with said first inlet and a second inlet port in fluid communication with said second inlet;
      a pressure balancer rotatably supported within said valve housing, said pressure balancer having a first inlet passage, a first outlet passage, a second inlet passage and a second outlet passage;
      a valve element rotatably fixed to said valve housing adjacent said first and second outlet passages, said valve element having a first outlet port and a second outlet port formed therethrough; and
      a bonnet attached to said casing an enclosing said fluid supply valve within said casing;
      wherein said pressure balancer is rotatably positionable to a closed position such that fluid communication from said first inlet port to said first inlet passage and said second inlet port to said second inlet passage is prohibited;
   a stem extending from said pressure balancer through said valve element for selectively rotating said pressure balancer between said closed position and said range of flow positions; and
   wherein said pressure balancer is rotatably positionable in a range of flow positions such that fluid communication is established in at least one of a first flow path from said first inlet port through said first inlet passage and said first outlet passage to said first outlet port and a second flow path from said second inlet port through said first inlet passage and said first outlet passage to said first outlet port.

* * * * *